United States Patent [19]

Fusy

[11] Patent Number: 4,715,404
[45] Date of Patent: Dec. 29, 1987

[54] ARRANGEMENT FOR DISASSEMBLING SEALING AND BEARING MEANS FROM ROTARY PIPE JOINTS

[75] Inventor: Joel Fusy, Barrault, France

[73] Assignee: FMC Corporation, Chicago, Ill.

[21] Appl. No.: 820,476

[22] Filed: Jan. 17, 1986

[30] Foreign Application Priority Data

Jan. 17, 1985 [FR] France .................. 8500659

[51] Int. Cl.[4] .............................. F16L 27/00
[52] U.S. Cl. .................. 137/615; 29/157 R; 29/426.1; 285/181; 285/272; 285/283
[58] Field of Search .............. 29/426.1, 157 R, 157 A; 285/181, 272, 283; 137/615; 138/120

[56] References Cited

U.S. PATENT DOCUMENTS

| | | | |
|---|---|---|---|
| 2,689,753 | 8/1954 | Wechsler | 285/272 |
| 3,057,646 | 10/1962 | Brumagim | 285/272 |
| 3,199,898 | 8/1965 | Faccou | 285/181 |
| 3,460,857 | 8/1969 | Larkin | 285/181 |
| 3,815,941 | 6/1974 | Snyder | 285/283 |
| 4,022,498 | 5/1977 | Jameson | 285/181 |
| 4,158,462 | 6/1979 | Coral | 285/283 |

FOREIGN PATENT DOCUMENTS

| | | | |
|---|---|---|---|
| 2949534 | 6/1981 | Fed. Rep. of Germany | 285/272 |
| 3013480 | 10/1981 | Fed. Rep. of Germany | 285/272 |

*Primary Examiner*—Howard N. Goldberg
*Assistant Examiner*—Ronald S. Wallace
*Attorney, Agent, or Firm*—W. William Ritt, Jr.; Richard B. Megley

[57] ABSTRACT

There is disclosed a loading arm for transfering liquids, gases, and particulate solids, in which the loading arm comprises a riser, inner and outer arm sections, and a rotary pipe joint pivotally interconnected and removably attached to both the inner and outer arm sections for rigidly interconnecting and supporting the arm sections in an arm-assembled position while the rotary pipe joint is being serviced or repaired. The arrangement is particularly advantageous for servicing sealing and bearing means located in the rotary pipe joint. Such joints are used in loading arms employed in transfer apparatus used to conduct cargo between transport and storage containers, for example, a marine transport vessel and wharf, pipeline, or other stationary facility.

14 Claims, 8 Drawing Figures

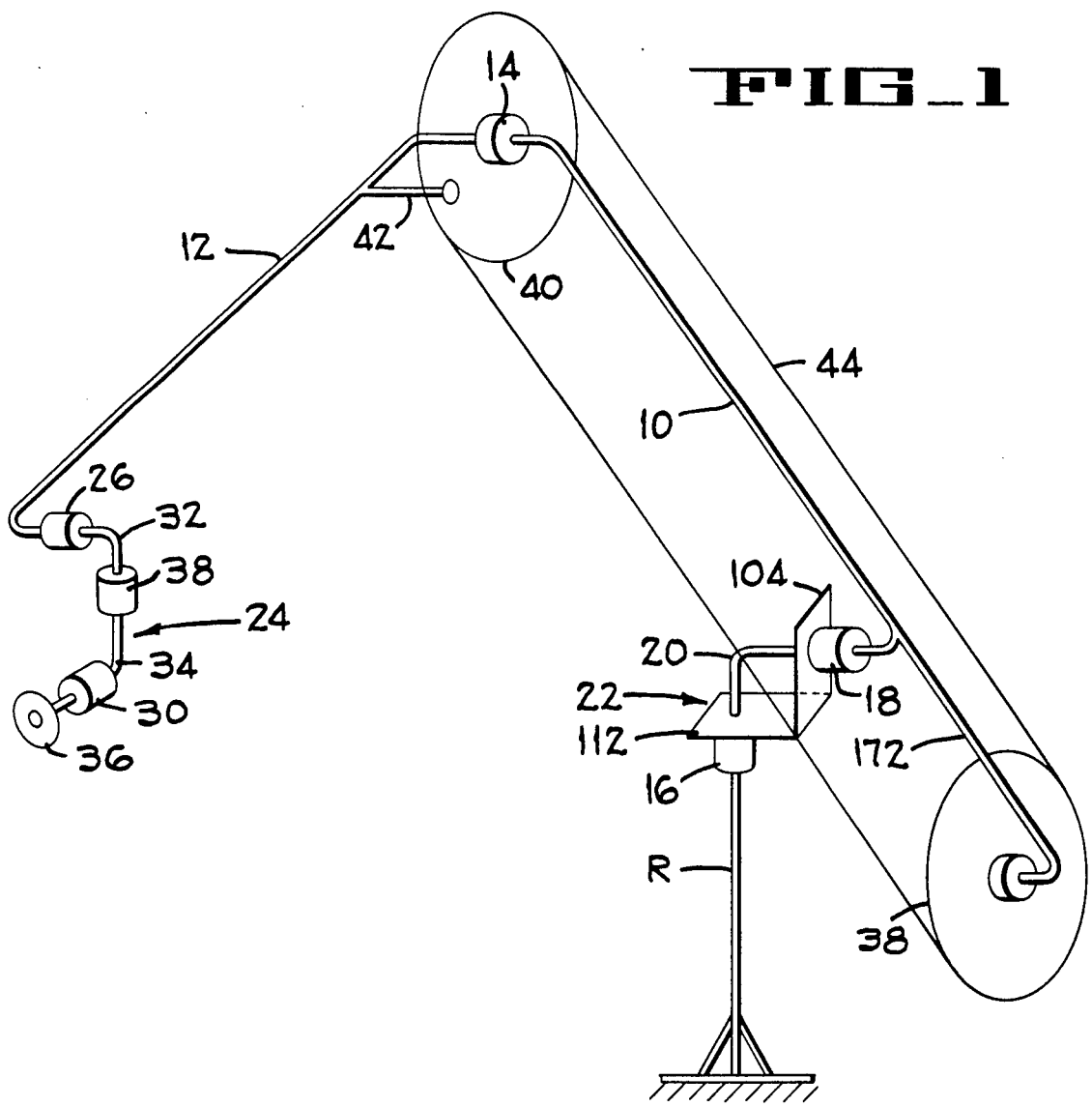
FIG_1
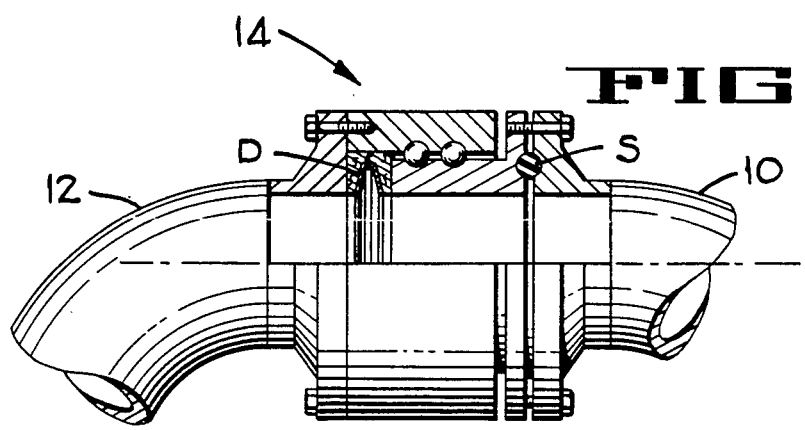
FIG_2

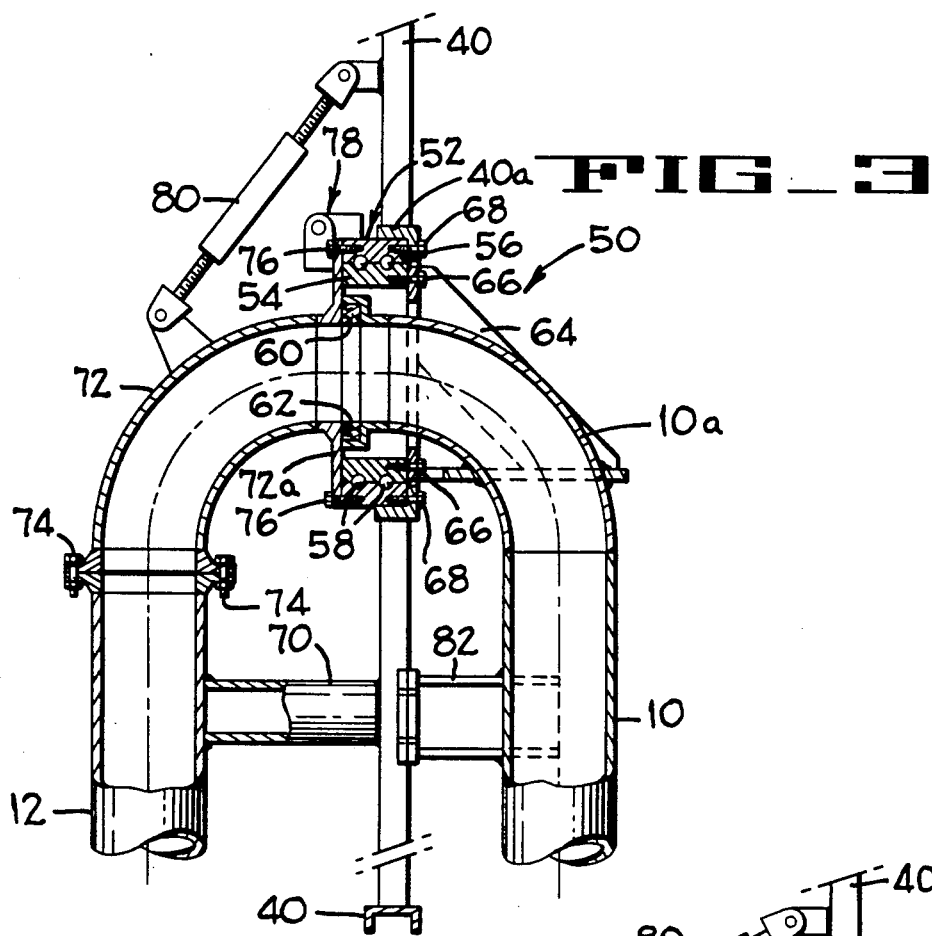
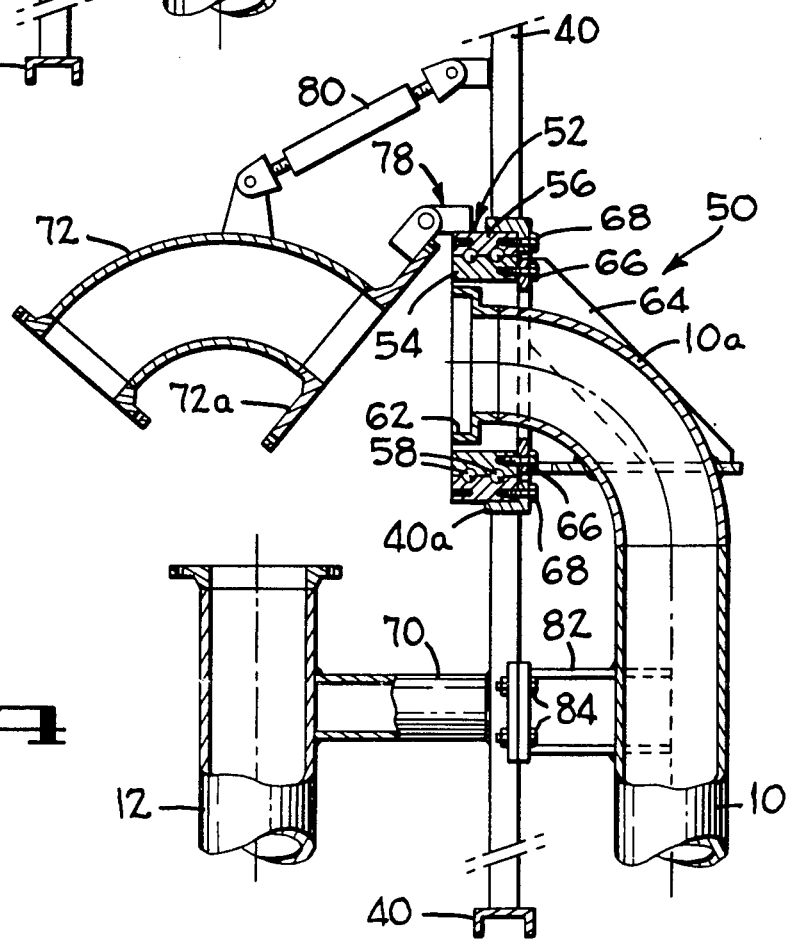

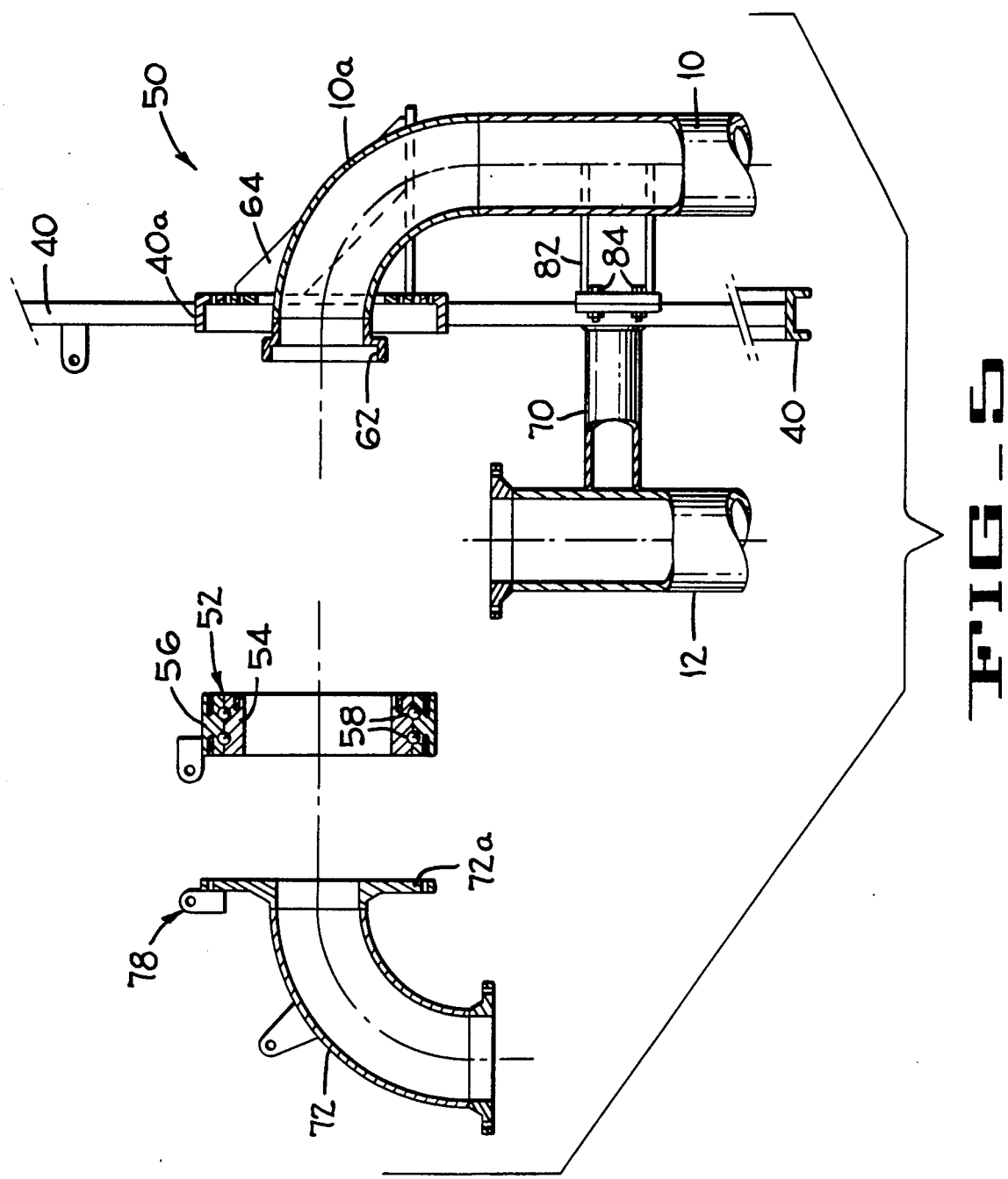
FIG_5

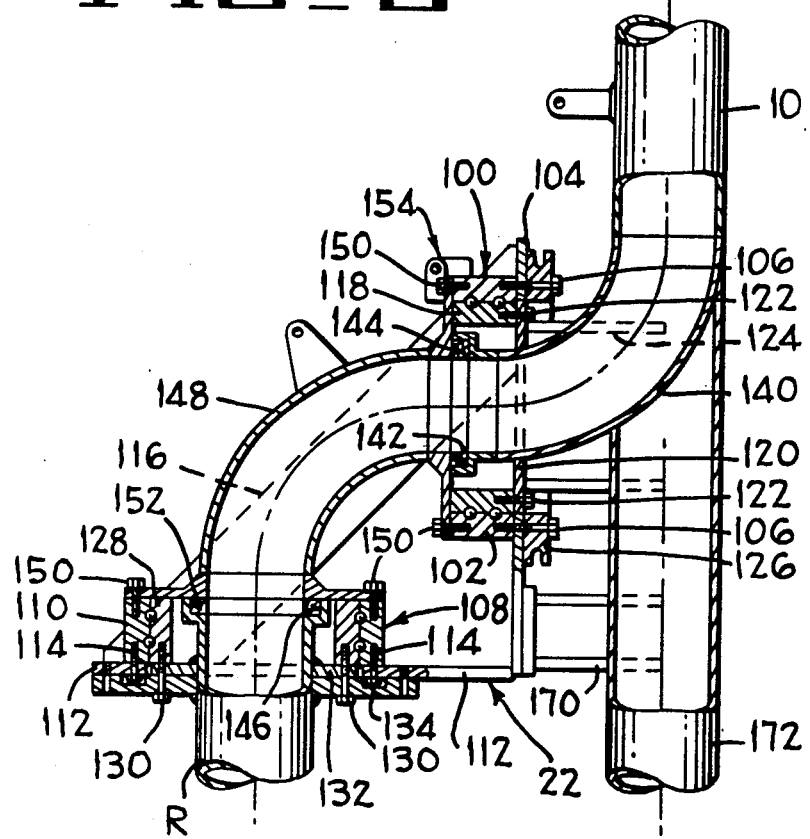
FIG_6
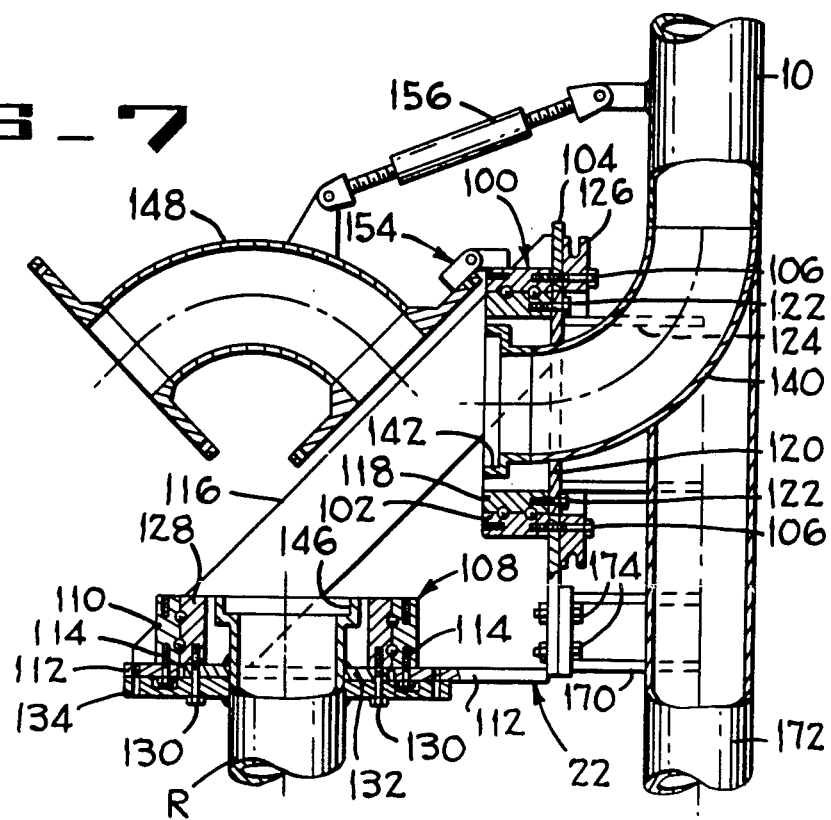
FIG_7

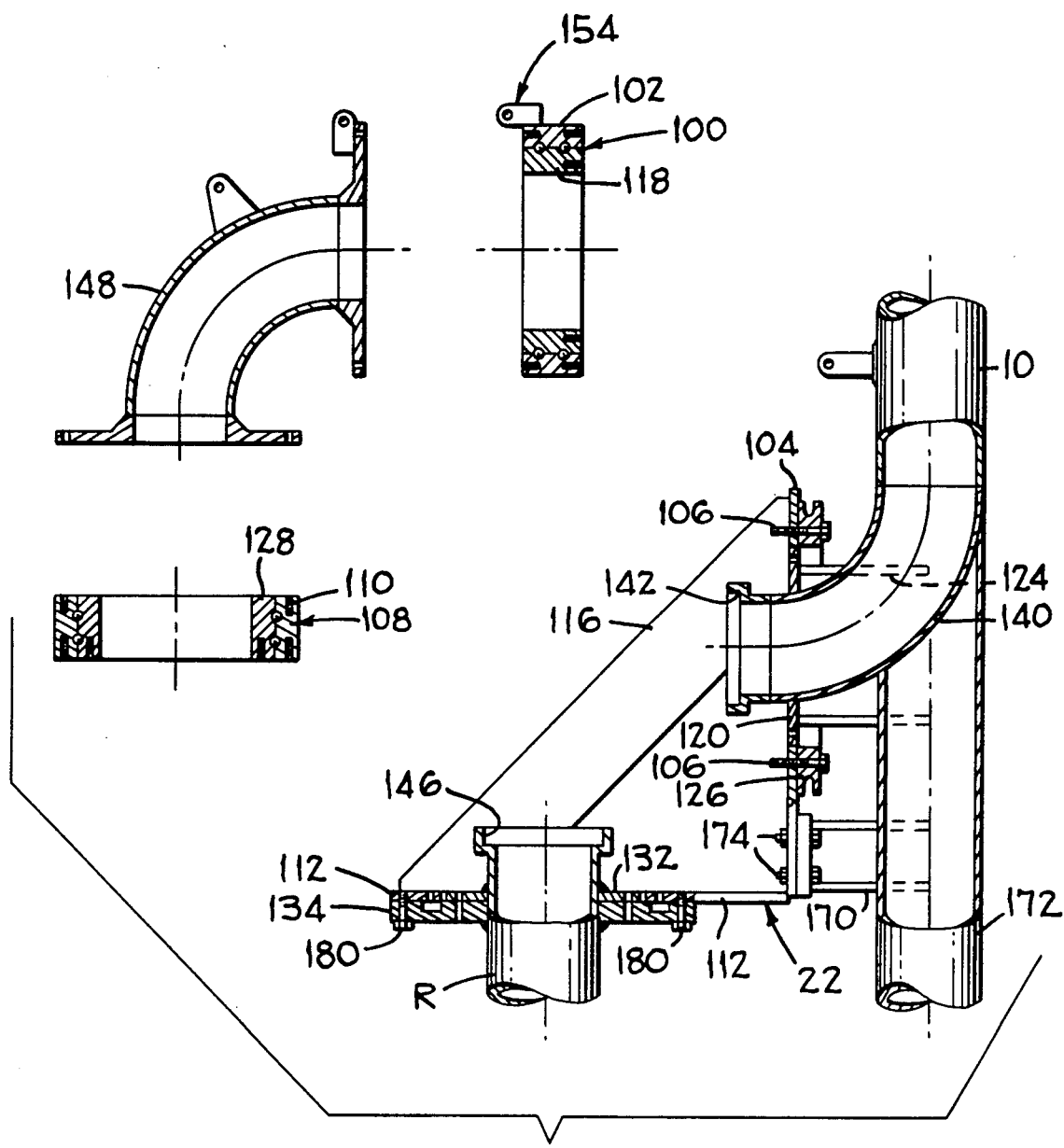

ARRANGEMENT FOR DISASSEMBLING SEALING AND BEARING MEANS FROM ROTARY PIPE JOINTS

BACKGROUND OF THE INVENTION

This invention relates to an arrangement for disassembling sealing and bearing means from rotary pipe joints, and particularly for simplifying removal of such means from rotary joints employed in fluid transfer apparatus used for conducting liquids, gases or particulate solids between transport and storage containers.

This invention is especially advantageous when embodied in marine loading arms commonly utilized for transferring crude oil and/or petroleum products between a tanker or other marine transport vessel and a terminal pipeline on a wharf or other stationary facility. As diagrammatically illustrated in FIG. 1 of the drawings, such an arm generally comprises an inner arm section 10 and an outer arm section 12 interconnected by a rotary pipe joint 14 such as that illustrated in FIG. 2, and an upstanding base or riser R upon which the inner pipe section 10 is pivotally mounted by vertical and horizontal rotary pipe joints 16, 18 that are interconnected by a pipe elbow 20. A bracket 22, secured to an element on each joint 16, 18, supports the arm so that the elbow 20 can be removed to replace or service the joint packings or seals without dismounting the arm from the riser. The outer end of the outer arm section 12 usually is provided with a triple joint assembly 24 comprising three rotary pipe joints 26, 38, 30 oriented on mutually perpendicular axes and interconnected by 90 degree pipe elbows 32, 34, and terminates in a pipe coupler 36 for releasably connecting the arm to the pipe manifold of a marine tanker (not shown). A pantograph-like sheave and cable assembly, generally comprising an inner sheave 38 rotatably mounted on the inner end of the inner arm section 10, an outer sheave 40 rotatably mounted on the outer end of the inner arm section 10 and non-rotatably secured to the outer arm section 12 as by a strut 42, and a cable 44 trained around both sheaves, provides a means to pivot the outer arm section 12 about the axis of the joint 14, and thus with respect to the inner arm section 10, when the inner sheave 38 is rotated as by hydraulic cyclinders or other suitable power means (not shown).

A conventional rotary pipe joint designed to be removable for servicing or replacement from the pipe system in which it is installed, such as the joint illustrated in FIG. 2, has several disadvantages: significant increased bulk resulting from the use of two flanges; the presence of a static seal S in addition to the conventional dynamic seal D, thereby introducing another path for potential leaks and establishing an interdependency between the bearing and static seal functions; and in order to adequately absorb significant loads either the parts of the joint must be extra heavy or the diameter of the flow passage must be increased over that of the pipes between which the joint is located.

SUMMARY OF THE INVENTION

The present invention overcomes these disadvantages by providing an improved arrangement for removing both the sealing and the bearing means from rotary pipe joints in which the sealing function is dissociated from the bearing function. The invention further facilitates removal of the entire rotary joint from the pipe system in which it is installed without additional disassembly of that system, minimizing the bulk of the joint, and offering the possibility of maintaining a constant diameter in the joint and pipes of the system while providing a larger nominal rotational diameter in the joint for adequately supporting the mechanical loads imposed thereon.

A rotary pipe joint for interconnecting the opposed ends of first and second pipe lengths in accordance with the present invention generally comprises an annular dynamic fluid packing or seal for functional positioning against the opposed end of the first pipe length, a rotary bearing means concentric with but independent of and spaced generally radially outward from the seal, a bracket or other suitable means for supporting the rotary bearing in functional position on the first pipe length, and a relatively short length of pipe, such as a pipe elbow, for removably positioning between the opposed end of the second pipe length and the seal and bearing. When the short length of pipe is in functional position one of its ends resides against the seal and is bolted or otherwise releasably secured to the bearing, and the other end is likewise releasably secured to the opposed end of the second pipe length, thereby forming a fluid tight flow passage between the first and second pipe lengths yet facilitating relative pivotal or rotational movement between them. Accordingly, when the short length of pipe is removed both the seal and the bearing are exposed for easy removal and servicing without need for further disassembly of the pipe system in which they are installed. The elbow or other short pipe length and the female element of the bearing means can be further interconnected by a hinge so that the elbow or short pipe length can be pivoted away from the bearing to provide access to the seal and then easily returned into proper functional position between the bearing and the second pipe length without necessitating time-consuming and/or difficult alignment procedures. Further advantages of the present invention include the provision of separate but concentric annular housings for the packing or seal and the bearing, such as illustrated in the drawings, and a means of ridgidly supporting the two pipes connected by the rotary joint during its disassembly and servicing procedures.

Additional advantages and features of the present invention will become evident from the following description which is made in reference to the drawings.

BRIEF DESCRIPTION OF THE DRAWINGS

FIG. 1 is a schematic view of an articulated fluid loading arm in which the present invention can be advantageously employed.

FIG. 2 is a fragmentary view in partial section of a conventional rotary pipe joint as commonly employed at the junction of the inner and outer arm sections of the FIG. 1 structure.

FIG. 3 is a fragmentary view, partly in section, of a rotary pipe joint of the present invention as employed between the inner and outer arm sections of a fluid loading arm of the type illustrated in FIG. 1.

FIG. 4 is a view like FIG. 3 but showing the packing chamber of the joint exposed and the packing removed therefrom.

FIG. 5 is an exploded view, partly in section, of the joint of FIGS. 3 and 4.

FIG. 6 is a fragmentary view, partly in section, of an assembly of two rotary pipe joints according to the present invention employed between the inner arm section and the riser of a fluid loading arm of the type illustrated in FIG. 1.

FIG. 7 is a view like FIG. 6 but showing the packing chambers of the joints exposed and the packings removed.

FIG. 8 is an exploded view, partly in section, of the assembly of FIGS. 6 and 7.

DESCRIPTION OF THE PREFERRED EMBODIMENTS

Referring first to the embodiment illustrated in FIGS. 3–5, wherein a rotary pipe joint assembly 50 according to the present invention is employed at the intersection of the inner and outer arm sections 10, 12 of a fluid loading arm such as that of FIG. 1, the joint 50 comprises a ball bearing 52 having an annular inner element 54, an annular outer element 56, and balls 58 located in annular raceways between the elements 54, 56, an annular packing or seal means 60 positioned in a chamber 62 coaxial with spaced radially inwardly and entirely dissociated from the bearing 52, and a support bracket 64 welded or otherwise fixed to a pipe elbow 10a at the outer end of the inner arm section 10. The inner element 54 of the bearing 52 is releasably secured to the bracket 64 by a plurality of circumferentially spaced cap screws 66, and the outer element 56 of the bearing is likewise secured by cap screws 68 to an annular hub 40a of the outer sheave 40. A strut 70 extends between and is fixed to the sheave 40 and the outer arm section 12 so that as the sheave 40 is rotated by the cable 44 (FIG. 1) the arm section 12 rotates in unison therewith about the axis of the bearing 52.

Extending between the inner arm section elbow 10a and the outer arm section 12 is a pipe elbow 72 that is releasably secured to the outer arm section 12 by a plurality of circumferentially spaced bolts 74, and that has a radial flange 72a on its other end which is releasably secured to the outer element 56 of the bearing 52 by a plurality of circumferentially spaced cap screws 76. The radial flange 72a also functions to retain the annular packing 60 in its chamber 62 so that when the joint is in fully assembled condition (FIG. 3) the packing functions as a static and dynamic fluid seal between the elbows 10a and 72, and thus between the inner and outer arm sections 10, 12.

In order to support the weight of the elbow 72 during servicing of the packing 60 the elbow is further connected to the bearing's outer element 56 by a hinge assembly 78, and a turnbuckle 80 hingedly interconnects the elbow to the sheave 40. Accordingly, and as is illustrated in FIG. 4, when the packing 60 requires servicing the bolts 74 and the cap screws 76 are removed and the elbow 72 is pivoted on the hinge 78 away from both the elbow 10a and the outer arm section 12, exposing the packing for easy access. A strut 82, fixed to the inner arm section 10 and extending to the sheave 40, facilitates rigidly securing the inner arm section to the sheave, and thus also to the outer arm section 12 through the strut 70, by bolts or other suitable fastening means 84 (FIG. 4) to prevent relative movement between the arm sections during servicing operations.

When the bearing 52 requires servicing or replacement, the strut 82 is secured to the sheave 40 by the bolts 84, the bolts 74 and the cap screws 76 are removed and the hinge 78 is disconnected to free the elbow from the outer arm section 12 and the bearing 52, and the cap screws 66, 68 are removed to release the bearing from the bracket and the annular hub 40a of the outer sheave 40, respectively, thereby facilitating removal of the bearing from the arm.

FIGS. 6–8 illustrate the embodiment of the present invention at the pivoted mounting of the inner arm section 10 on the upstanding riser R. This mounting arrangement comprises a first ball bearing 100 oriented on a horizontal axis and with its outer annular element 102 releasably secured to a vertical plate 104 of the bracket 22 by a plurality of circumferentially space cap screws 106, and a second ball bearing 108 oriented on a vertical axis and with its outer annular element 110 releasably secured to a horizontal plate 112 of the bracket by a plurality of circumferentially spaced cap screws 114. The plates 104, 112 of the bracket 22 are welded or otherwise fixed in position to each other, and one or more transverse struts 116 (only one shown) extend between the two plates 104, 112 to provide them with further support. The inner annular element 118 of the bearing 100 is releasably secured to an annular plate 120 by a plurality of circumferentially spaced cap screws 122, and the plate 120 is fixedly secured to the inner arm section 10 by one or more struts 124. Thus the inner arm section can pivot about the horizontal axis of the bearing 100, and this pivotal movement can be powered by means of a conventional sheave and cable arrangement, including a sheave 126 secured to the bracket plate 104 by the cap screws 106 and cables and hydraulic cylinders (not shown) attached to the inner arm section 10.

The inner annular element 128 of the bearing 108 is fixedly secured to the riser R by a plurality of circumferentially spaced cap screws 130 that extend through a first radial flange 132 which is welded to the riser. The cap screws 130 also extend through a second radial flange 134 welded to the riser R, below and of greater diameter than the flange 132. Thus the bracket 22, and therefore the inner arm section 10, can pivot or slew about the vertical axis through the bearing 108, and hence the riser R.

At the inner end of the inner arm section 10 is a pipe elbow 140 that extends through the annular plate 120 to terminate in an annular packing chamber 142 in which an annular packing 144 resides, and the upper end of the riser R terminates in a like annular packing chamber 146. A pipe elbow 148 analagous to the elbow 20 of FIG. 1, is releasably secured to the outer element of the bearings 100, 108 by pluralities of circumferentially spaced cap screws 150, and the end flanges of the elbow 148 function also to retain annular static and dynamic packings 144 and 152. Similar to the FIGS. 3–5 arrangement, the elbow 148 is further attached to the outer element 102 of the bearing 100 by a hinge 154, and a turnbuckle assembly 156 is attachable to the inner arm section 10 and the elbow 148 to assist in moving the elbow up and away from its functional position when preparing to service the packings and/or the bearings (FIG. 7). As will be readily understood, removing the cap screws 150, releases the elbow 148 for movement out of functional position (FIG. 6) into packing servicing position (FIG. 7). Also, removal of the cap screws 106 and 122 frees the bearing 100 from the arm and bracket, and likewise removal of the cap screws 114, 130 frees the bearing 108 from the bracket and the riser.

In order to present movement of the arm about the axis of the bearing 100 during servicing procedures, a strut 170 that is welded or otherwise fixed to an extension 172 of the inner arm section 10 is releasably secured to the bracket 22 by bolts 174. In order to prevent pivotal or slewing movement of the arm about the axis of the bearing 108 and riser R, cap screws 180 (FIG. 8) are installed between the bracket plate 112 and the lower riser plate 134, thereby releasably securing these plates against relative movement.

Finally, it will be understood that this invention was only described and illustrated in a preferential and exemplifying form of embodiment and that equivalent parts can be substituted for its constituents without however departing from its scope.

What is claimed is:

1. A loading arm, for transferring liquids, gases and particulate solids, comprising:
   (a) a generally upstanding riser;
   (b) an inner arm section pivotally mounted on the riser;
   (c) an outer arm section;
   (d) a rotary pipe joint pivotally interconnecting and removably attached to said inner and outer arm sections, said pipe joint comprising annular inner and outer elements interconnected for relative rotation by bearing means; and
   (e) arm section support means attached to and extending from one of said arm sections and releaseably attachable to the other arm section for rigidly interconnecting and supporting said arm sections in an arm-assembled position while the rotary pipe joint is removed from the arm.

2. A loading arm according to claim 1 wherein the arm section support means comprises a first bracket fixed to said one arm section, a second bracket fixed to said other arm section, and means for rigidly yet releaseably interconnecting said brackets to immobilize the arm sections with respect to each other.

3. A loading arm according to claim 1 including annular seal means between the inner and outer arm sections.

4. A loading arm according to claim 3 wherein the seal means is concentric with but independent of and spaced generally radially from the pipe joint.

5. A loading arm according to claim 3 wherein one of the arm sections includes a pipe elbow releaseably connected to one of the pipe joint elements and functionally positioned to expose the seal means for servicing when said elbow is removed.

6. A loading arm according to claim 5 including means for pivoting the elbow out of its functional position to expose the seal means.

7. A loading arm according to claim 6 wherein the pivoting means comprises a hinge releasably interconnecting the elbow and the pipe joint, and an adjustable tension means for pivoting the elbow away from the pipe joint about the hinge axis.

8. A loading arm, for transferring liquids, gases and particulate solids, comprising:
   (a) a generally upstanding riser;
   (b) an arm support secured to the riser;
   (c) an inner area section;
   (d) means pivotally mounting the inner arm section on the arm support, said mounting means comprising a first rotary pipe joint with annular inner and outer bearing elements interconnected for relative rotation, one of said bearing elements releasably connected to the inner arm section and the other of said bearing elements releasably connected to the arm support; and
   (e) means for rigidly yet releasably securing the inner arm section to the arm support to facilitate removal of the first rotary pipe joint bearing elements from the loading arm while maintaining the inner arm section in position on the riser.

9. A loading arm according to claim 8 including an outer arm section, a third rotary pipe joint with annular inner and outer bearing elements interconnected for relative rotation, one of said third joint bearing elements releaseably connected to the outer arm section, and means for rigidly yet releasably interconnecting said arm sections to maintain said sections in assembled position while the third rotary pipe joint is removed from the arm.

10. A loading arm according to claim 8 including annular seal members concentric with but independent of and spaced generally radially from the first rotary pipe joint.

11. A loading arm according to claim 8 including a pipe elbow releasably connected to and functionally positioned between the riser and the first rotary pipe joint.

12. A loading arm according to claim 11 including annular seal means between the pipe elbow and the inner arm section, and means for moving the pipe elbow out of its functional position to expose the seal means for servicing thereof.

13. A loading arm according to claim 8 wherein the arm support is secured to the riser by a second rotary pipe joint with inner and outer bearing elements interconnected for relative rotation, one of said second joint bearing elements releasably connected to the riser and the other of said second joint bearing elements releasably connected to the arm support.

14. A loading arm according to claim 13 including a pipe elbow releasably connected to and functionally positioned between the first and second rotary pipe joints.

* * * * *